(12) United States Patent
Suau et al.

(10) Patent No.: US 6,956,090 B1
(45) Date of Patent: Oct. 18, 2005

(54) METHOD FOR OBTAINING WATER-SOLUBLE POLYMERS, RESULTING POLYMERS AND USES THEREOF

(75) Inventors: Jean-Marc Suau, Lucenay (FR); Christian Jacquemet, Lyons (FR); Jean-Bernard Egraz, Ecully (FR); Jacques Mongoin, Quincieux (FR)

(73) Assignee: Coatex S.A., Genay (FR)

( * ) Notice: Subject to any disclaimer, the term of this patent is extended or adjusted under 35 U.S.C. 154(b) by 0 days.

(21) Appl. No.: 10/070,424

(22) PCT Filed: Sep. 13, 2000

(86) PCT No.: PCT/FR00/02519

§ 371 (c)(1),
(2), (4) Date: Jul. 30, 2002

(87) PCT Pub. No.: WO01/19874

PCT Pub. Date: Mar. 22, 2001

(30) Foreign Application Priority Data

Sep. 16, 1999 (FR) .................................... 99 11798

(51) Int. Cl.[7] .............................. C08F 4/08; C08F 4/10; C08F 4/00
(52) U.S. Cl. .................. 526/233; 526/317.1; 526/281; 526/271; 525/329.5; 525/330.2; 525/362
(58) Field of Search ............................ 526/233, 317.1, 526/281, 271, 253; 524/425, 547, 556; 525/329.5, 525/330.2, 362

(56) References Cited

U.S. PATENT DOCUMENTS

| | | | |
|---|---|---|---|
| 5,109,090 A | 4/1992 | Mongoin et al. | |
| 5,278,248 A | 1/1994 | Egraz et al. | |
| 5,736,601 A * | 4/1998 | Egraz et al. | 524/425 |
| 5,866,664 A * | 2/1999 | McCallum et al. | 526/233 |
| 5,880,085 A | 3/1999 | Kensicher et al. | |
| 5,891,972 A * | 4/1999 | Egraz et al. | 526/233 |
| 6,063,884 A | 5/2000 | Egraz et al. | |
| 6,093,764 A | 7/2000 | Egraz et al. | |
| 6,184,321 B1 | 2/2001 | Egraz et al. | |

FOREIGN PATENT DOCUMENTS

| | | |
|---|---|---|
| EP | 0 405 818 | 1/1991 |
| EP | 0 792 890 | 9/1997 |
| WO | 91 12278 | 8/1991 |

OTHER PUBLICATIONS

U.S. Appl. No. 10/030,988, filed Apr. 12, 2002, Dupont et al.
U.S. Appl. No. 10/070,424, filed Jul. 30, 2002, Suau et al.
U.S. Appl. No. 10/311,219, filed Dec. 16, 2002, Suau et al.
U.S. Appl. No. 10/322,522, filed Dec. 19, 2002, Egraz et al.

(Continued)

*Primary Examiner*—David W. Wu
*Assistant Examiner*—Satya Sastri
(74) *Attorney, Agent, or Firm*—Oblon, Spivak, McClelland, Maier & Neustadt, P.C.

(57) ABSTRACT

A method of obtaining homopolymers and/or copolymers in aqueous solution by the use of phosphorous acid and/or its salts or sodium hypophosphite and by neutralization during the polymerisation of the ethylenically unsaturated monomers by the continuous addition, first of all, of bases such as sodium hydroxide, potassium hydroxide or lithium hydroxide and then bases of alkaline earths such as calcium hydroxide, magnesium hydroxide, calcium oxide or magnesium oxide.

The polymers obtained by the said method and uses thereof.

12 Claims, 1 Drawing Sheet

OTHER PUBLICATIONS

U.S. Appl. No. 10/168,389, filed Jun. 21, 2001, Suau et al. 1996fr-09345/ap.prn; Egraz, J: Kensicher, Y; Suau, J; Homo- and copolymers of unsaturated monomers used for example for grinding or dispersing agents for mineral materials, water retention agents and anti-scale agents which have a very low content of residual monomer(s).: Jul. 19, 1996; Basic Abstract.

Egraz, J; Kensicher, Y; Suau, J; Suau, J M; Egraz, J B; Obtaining aqueous solutions of homo- and/or copolymer of unsaturated monomers—comprises using phosphorus compounds having specified oxidation degree, in presence of hydrogen peroxide and absence of free radical decomposition agents.; Jul. 19, 1996; Basic Abstract.

* cited by examiner

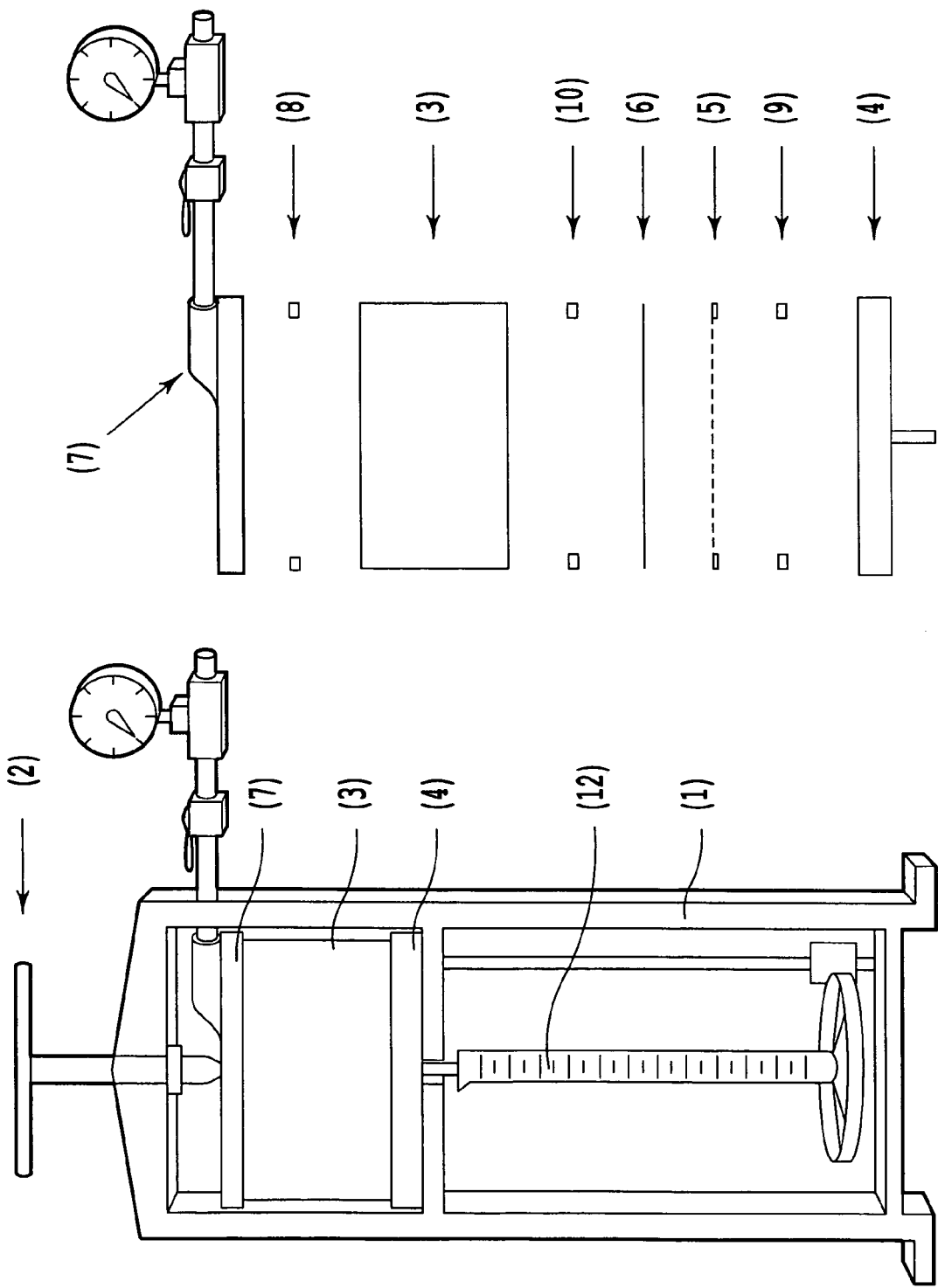

METHOD FOR OBTAINING WATER-SOLUBLE POLYMERS, RESULTING POLYMERS AND USES THEREOF

BACKGROUND OF THE INVENTION

1. Field of the Invention

The invention relates to a novel method of obtaining homopolymers and/or copolymers, in an aqueous solution of monoethylenically unsaturated monomers such as acrylic and/or vinyl monomers, making it possible to obtain directly usable polymers.

The invention also relates to the homopolymers and/or copolymers obtained by the said method as well as their use as an aid to the grinding and/or dispersion in aqueous solution of mineral materials, or as a sequestring agent or mineral scale and/or incrustation inhibitor in particular on the heat transfer surfaces of industrial or domestic installations or as a fluidising agent for aqueous solutions based on soft or saline water normally used as drilling fluids in the fields of civil engineering, building, public works, petroleum prospecting or extraction or as a zeolite suspension stabiliser and as an antiscaling agent or as a water retaining agent in the paper making industry or also as builder or co-builder in detergent compositions or finally as dispersant which does not destabilise the chlorometric rate of the hypochlorite compositions in the detergent formulations containing it.

Finally, the invention relates to the said aqueous solutions of mineral materials which are stable over time and have a high concentration of mineral materials as well as their use in the field of paper, paint, detergent and cleaning formulations and any other field using the said suspensions such as in particular ceramics or drilling fluids.

2. Discussion of the Background

For a long time already persons skilled in the art have known various methods for homopolymerising in solution acrylic and/or vinyl monomers such as in particular acrylic acid, methacrylic acid, maleic anhydride or acrylamide as well as for copolymerising, in solution in water, acrylic acid with other monoethylenically unsaturated monomers such as for example maleic anhydride, itaconic acid, acrylamide or acrylamido methyl propanesulfonic acid.

Thus the patents FR 2 751 335, EP 0 405 818, EP 0 618 240, U.S. Pat. No. 4,621,127 and EP 0 792 890 describe methods of polymerising acrylic acid.

Likewise a person skilled in the art has available U.S. Pat. No. 4,301,266, which describes a method of manufacturing acrylic acid polymers having the drawback of requiring the use of a solvent of the isopropanol type and requiring work under pressure, and distillation in order to eliminate the solvent.

Finally, persons skilled in the art also know the patents FR 2 539 137, EP 0 542 644 or EP 0 516 656 teaching that neutralisation of acrylic polymers with alkaline earths makes it possible to obtain agents for the grinding of calcium carbonate by the wet method, these suspensions being particularly stable over time.

However, all these polymerisation techniques well known to persons skilled in the art require a step of neutralisation of the polymer solution obtained in acid form or partially neutralised subsequently to the polymerisation reaction, then obliging the producer of these polymers either to equip himself with equipment specific to the polymerisation and another type of equipment peculiar to the neutralisation reactions or to occupy the polymerisation reactors for a longer time, which has the consequence of reducing the productivity of the installation and therefore increasing the cost of the products.

SUMMARY OF THE INVENTION

Confronted with these various drawbacks, which cannot fully satisfy a person skilled in the art, the Applicant has found, surprisingly, that dispersing agents and/or high-efficiency grinding aids of mineral materials can be obtained by the polymerisation of acrylic acid and ethylenically unsaturated monomers using phosphorous acid and/or its salts or sodium hypophosphite provided that, during the polymerisation process, neutralisation agents consisting of alkaline earths are introduced into the reaction medium after the partial neutralisation of the monomer or monomers by means of an alkali ion such as in particular sodium, potassium or lithium or the like.

This particular reaction then makes it possible to obtain, in a single step (the polymerisation and neutralisation being simultaneous), a grinding aid and/or dispersing agent in aqueous suspension of mineral materials.

These aqueous suspensions of mineral particles have a high concentration of mineral materials and have a Brookfield viscosity which is low and stable over time, even without stirring.

This aim is achieved by virtue of the method according to the invention, that is to say using phosphorous acid and/or its salts or sodium hypophosphite and by neutralisation during the polymerisation of the ethylenically unsaturated monomers by continuously adding, first of all, bases such as sodium hydroxide, potassium hydroxide or lithium hydroxide and then alkaline earth bases such as calcium hydroxide, magnesium hydroxide, calcium oxide or magnesium oxide.

BRIEF DESCRIPTION OF THE DRAWINGS

FIG. 1 shows a filter press.

DETAILED DESCRIPTION OF PREFERRED EMBODIMENTS

Thus one of the aims of the invention is the development of the said method making it possible to obtain polymers in solution in a single step.

Another aim of the invention is to provide a grinding aid and/or a dispersing agent in aqueous suspension of mineral materials making it possible to arrive at aqueous dispersions of mineral materials which have a high concentration of mineral material and have a Brookfield viscosity which is low and stable over time, even without stirring.

In addition another aim of the invention is to provide a sequestring agent or antiscaling agent or mineral scale inhibitor and/or incrustation inhibitor when the molecular weight of the said homopolymers and/or copolymers is sufficiently low to be suited to the said application.

In addition to these aims, an additional object of the invention is to obtain a fluidising agent for aqueous suspensions used as drilling fluids or to develop a stabiliser for aqueous suspensions of zeolites as well as to obtain an antiscaling agent.

In addition, another aim of the invention relates to the mineral aqueous suspensions obtained by the use of the said agents.

Finally, another aim of the invention relates to the use of these mineral aqueous suspensions in the fields of the filling and coating of paper as well as paint, ceramics, detergents and drilling mud.

Thus the method according to the invention of obtaining homopolymers and/or copolymers, in aqueous solution, of ethylenically unsaturated monomers is characterised by the use of phosphorous acid and/or its salts or sodium hypophosphite and by neutralisation during the polymerisation of the ethylenically unsaturated monomers by the continuous addition, first of all, of bases such as sodium hydroxide, potassium hydroxide or lithium hydroxide and then alkaline earth bases such as calcium hydroxide, calcium oxide, magnesium hydroxide or magnesium oxide.

The ethylenically unsaturated monomer or monomers is (are) chosen from amongst at least one of the ethylenically unsaturated anionic monomers or comonomers such as acrylic and/or methacrylic, itaconic, crotonic or fumaric acid, maleic anhydride or isocrotonic, aconitic, mesaconic, sinapinic, undecylenic or angelic acid, acrylamido methyl propanesulphonic acid (referred in the remainder of the description as AMPS) or sodium methallylsulphonate or possibly chosen from amongst the ethylenically unsaturated non-ionic comonomers such as acrylamide and/or methacrylamide.

The ethylenically unsaturated monomer or monomers is (are) preferentially chosen from amongst acrylic or methacrylic acid and, highly preferentially, the invention uses solely acrylic acid.

In the method according to the invention, the homopolymerisation or copolymerisation reaction, and whatever the ratio by weight of the monomers, is effected by the use of phosphorous acid and/or its salts or sodium hypophosphite in a quantity determined according to the molecular weight required for the polymer, possibly in the presence of all or some of the water necessary for obtaining a homogenous solution.

All or some of the quantity of the said phosphorous acid and/or its salts or of the said sodium hypophosphite can be introduced completely at the bottom of the polymerisation tank or added throughout the polymerisation at the same time as the other additions.

These other additions, which can be chosen from amongst the polymerisation initiators well known to persons skilled in the art such as in particular hydrogen peroxide alone or in a mixture with metallic salts, for example iron or copper, tert-butyl hydroperoxide, or sodium or potassium persulphates, and the like.

The total quantity of phosphorous acid and/or its salts or sodium hypophosphite used in the method according to the invention is greater than or equal to 0.5% by weight with respect to the total mass of the monomer or monomers making up the polymer according to the invention.

In the method according to the invention, the bases used are chosen from amongst sodium hydroxide, potassium hydroxide or lithium hydroxide.

They can be added in solution form but also in the form of pellets or in powder form.

The alkaline earth bases used are chosen from amongst calcium hydroxide, calcium oxide, magnesium hydroxide or magnesium oxide.

The latter can be added in suspension form or in the form of a powder but also in the form of salts of the corresponding anionic monomers such as in particular in the form of calcium and/or magnesium acrylate or methacrylate.

It should also be noted that, in the method according to the invention, the molecular weight of the required copolymer is not only a function of the quantity of initiators used but also the level of phosphorus involved as well as the concentration of the medium.

The polymerizate obtained can also be processed by any known means in order to eliminate the water therefrom and isolate it in the form of a fine powder and to use it in this form.

According to a variant of the invention, the polymers in solution according to the invention obtained by the method according to the invention and intended to be used as a grinding aid and/or dispersing agent, as a sequestring agent or scale and/or incrustation inhibitor or as an agent for fluidising aqueous solutions such as drilling fluids or as a zeolite stabilising agent can subsequently be fractionated by fractionation means well known to persons skilled in the art.

The polymers according to the invention are characterised in that they are obtained by the method according to the invention.

In addition they are characterised in that the degree of neutralisation of the active acid sites is between 40% and 90%, limits included, for alkali ions such as sodium, potassium or lithium, and between 10% and 60%, limits included, for alkaline earth ions such as calcium and magnesium.

The homopolymers and/or copolymers intended to be used according to the invention as a dispersing agent and/or grinding aid or a fluidiser for drilling muds or as a stabiliser for zeolite suspensions in detergent compositions or generally have a molecular weight in terms of $M_w$ weight between 2000 and 16,000, preferentially between 3500 and 6500, determined by aqueous GPC, for which the standards, used as references, belong to a series of sodium polyacrylates sold by the company Polymer Standards Service under the names PSS-PAA varying from 18K to 2K.

Likewise, when the polymer and/or copolymer according to the invention, obtained by the method of the invention is used in the treatment of industrial and/or domestic water for the purpose of conferring for example antiscaling and anticorrosion effects on these media or is used in the field of reverse osmosis and ultrafiltration for the purpose of sequestring the cations present, its molecular weight in terms of $M_w$ weight is between 2000 and 10,000, determined according to the same GPC measuring method as described above.

In practice the operation of dispersing of the mineral substance to be dispersed consists of preparing under stirring an aqueous solution of the dispersion agent according to the invention into which there is introduced the mineral substance to be dispersed, which can have highly diverse origins, such as natural or synthetic calcium carbonate, dolomites, calcium sulphate, titanium dioxide or lamellar pigments such as for example mica or kaolin, that is to say all the mineral substances which must be put in suspension and dispersed in order to be useable in applications as diversified as the coating of papers, the pigmentation of paints, ceramics, drilling muds or detergents.

Likewise, in practice, the operation of grinding the mineral substance to be refined consists of grinding the mineral substance with a grinding body into very fine particles in an aqueous medium containing the grinding agent. First of all an aqueous suspension of the mineral substance to be ground is formed, whose grains have an initial size of no more than 50 microns at the required concentration.

The grinding body with a granulometry advantageously between 0.20 and 4 millimeters is added to the suspension of the mineral substance to be ground. The grinding body is in general in the form of particles and materials as diverse as silicon dioxide, aluminium oxide, zirconium oxide or mixtures thereof, as well as high-hardness synthetic resins, steels or others. An example of a composition of such a grinding body is given by the patent FR 2 303 681, which describes grinding elements formed by 30 to 70% by weight zirconium oxide, 0.1 to 5% aluminium oxide and 5 to 20% silicon dioxide. The grinding body is preferably added to the suspension in a quantity such that the ratio by weight between this grinding material and the mineral material to be ground is at least 2/1, this ratio preferably being between the limits 3/1 and 5/1.

The mixture of the suspension and grinding body is then subjected to the mechanical action of stirring, such as the one which occurs in a conventional microelement grinder.

The grinding aid and/or dispersing agent according to the invention is also introduced into the mixture formed by the aqueous suspension of mineral substances and by the grinding body at the rate of 0.2 to 2% by weight of the dried fraction of the said polymers with respect to the dry mass of the mineral substance to be refined.

The time required for arriving at an excellent degree of fineness of the mineral substance after grinding varies according to the nature and quantity of the mineral substances to be ground, and according to the stirring mode used and the temperature of the medium during the grinding operation.

The scope and advantage of the invention will be perceived more clearly by means of the following examples, which are not limitative:

EXAMPLE 1

The purpose of this example is to illustrate the method, according to the invention, of obtaining acrylic acid homopolymers or copolymers by the addition, throughout the polymerisation reaction, of neutralisation agents commencing with the base corresponding to the alkali ion.

To do this, in a polymerisation reactor previously heated and filled with a load composed of water, phosphorous acid and the required quantity of soda for neutralising this acid, or sodium hypophosphite, the various following tests were carried out.

Test No 1

In a two-liter glass reactor equipped with stirring, a thermometer and a cooling system, a load referred to as a tank bottom was prepared at room temperature, composed of 104 grams of water, 43.9 grams of soda at 50% and 45 grams of 97% phosphorous acid.

During the rise in temperature of the tank bottom, four loads to be introduced during the polymerisation were prepared.

For this purpose, 450 grams of 100% acrylic acid were introduced into a first beaker, into a second beaker 25 grams of hydrogen peroxide at 130 volumes and 80 grams of water, into a third beaker 350 grams of soda at 50% and finally into a fourth beaker 70 grams of calcium hydroxide and 180 grams of water.

The hydrogen peroxide and acrylic acid were added separately and continuously during the two hours of polymerisation.

The soda contained in the third beaker was added proportionally to the acrylic acid and continuously. When all the soda was introduced, the lime contained in the fourth beaker was in its turn added until the end of the introduction of the acrylic acid.

The polymerizate then obtained in a single step was an orangey-yellow solution corresponding to a sodium and calcium polyacrylate completely neutralised in a ratio corresponding to a neutralisation of the active acid sites equal to 70% by sodium and 30% by calcium. The molecular weight $M_w$ of the polyacrylate thus obtained according to the invention was equal to 4400 determined according to the GPC method cited above.

Test No 2

This test was carried out with the same equipment, the same operating method and the same quantities of reagent as Test No 1 with the exception of the quantity of hydrogen peroxide, which was multiplied by 0.68.

The polymerizate then obtained in a single step was an orangey-yellow solution corresponding to a sodium and calcium polyacrylate completely neutralised in a ratio corresponding to a neutralisation of the active acid sites equal to 70% by sodium and 30% by calcium. The molecular weight $M_w$ of the polyacrylate thus obtained according to the invention was equal to 5000 determined according to the GPC method cited above.

Test No 3

This test was carried out with the same equipment, the same operating method and the same quantities of reagent as Test No 1 with the exception of the quantity of hydrogen peroxide, which was multiplied by 0.60.

The polymerizate then obtained in a single step was an orangey-yellow solution corresponding to a sodium and calcium polyacrylate completely neutralised in a ratio corresponding to a neutralisation of the active acid sites equal to 70% by sodium and 30% by calcium. The molecular weight $M_w$ of the polyacrylate thus obtained according to the invention was equal to 6200 determined according to the GPC method cited above.

Test No 4

This test was carried out with the same equipment, the same operating method and the same quantities of reagent as Test No 1 with the exception of the quantity of hydrogen peroxide, which was multiplied by 0.15.

The polymerizate then obtained in a single step was an orangey-yellow solution corresponding to a sodium and calcium polyacrylate completely neutralised in a ratio corresponding to a neutralisation of the active acid sites equal to 70% by sodium and 30% by calcium. The molecular weight $M_w$ of the polyacrylate thus obtained according to the invention was equal to 7200 determined according to the GPC method cited above.

Test No 5

This test was carried out with the same equipment, the same operating method and the same quantities of reagent as Test No 1 with the exception of the quantity of phosphorous acid and the quantity of soda present in the tank bottom, which were multiplied by 0.84.

The polymerizate then obtained in a single step was an orangey-yellow solution corresponding to a sodium and calcium polyacrylate completely neutralised in a ratio corresponding to a neutralisation of the active acid sites equal to 70% by sodium and 30% by calcium. The molecular weight $M_w$ of the polyacrylate thus obtained according to the invention was equal to 5500 determined according to the GPC method cited above.

Test No 6

This test was carried out with the same equipment, the same operating method and the same quantities of reagent as Test No 1 with the exception of the quantity of phosphorous acid which was multiplied by 1.10 and the quantity of soda present in the tank bottom, which was multiplied by 1.10.

The polymerizate then obtained in a single step was an orangey-yellow solution corresponding to a sodium and calcium polyacrylate completely neutralised in a ratio corresponding to a neutralisation of the active acid sites equal to 70% by sodium and 30% by calcium. The molecular weight $M_w$ of the polyacrylate thus obtained according to the invention was equal to 3800 determined according to the GPC method cited above.

Test No 7

In a two-liter glass reactor equipped with stirring, a thermometer and a cooling system, a load referred to as a tank bottom was prepared at room temperature, composed of 104 grams of water, 43.9 grams of soda at 50% and 45 grams of 97% phosphorous acid.

During the rise in temperature of the tank bottom, five loads to be introduced during the polymerisation were prepared.

For this purpose, 450 grams of 100% acrylic acid were introduced into a first beaker, into a second beaker 15 grams of hydrogen peroxide at 130 volumes and 65 grams of water, into a third beaker 20 grams of sodium persulphate and 60 grams of water, into a fourth beaker 237 grams of soda at 50% and finally into a fifth beaker 226 grams of magnesium hydroxide at 40% in water.

The soda contained in the fourth beaker was added continuously during the first hour of polymerisation at the same time as the hydrogen peroxide whilst the magnesium hydroxide contained in the fifth was added continuously during the second hour of polymerisation at the same time as the persulphate solution. The acrylic acid was added continuously during the two hours.

The polymerizate then obtained in a single step was an orangey-yellow solution corresponding to a sodium and magnesium polyacrylate completely neutralised in a ratio corresponding to a neutralisation of the active acid sites equal to 50% by sodium and 50% by magnesium. The molecular weight $M_w$ of the polyacrylate thus obtained according to the invention was equal to 3800 determined according to the GPC method cited above.

Test No 8

This test was carried out with the same equipment, the same operating method and the same quantities of reagent as Test No 7 with the exception of the use of a single catalyst, namely 20 grams of sodium persulphate in 120 grams of water.

The polymerizate then obtained in a single step was an orangey-yellow solution corresponding to a sodium and magnesium polyacrylate completely neutralised in a ratio corresponding to a neutralisation of the active acid sites equal to 50% by sodium and 50% by magnesium. The molecular weight $M_w$ of the polyacrylate thus obtained according to the invention was equal to 8600 determined according to the GPC method cited above.

Test No 9

This test was carried out with the same equipment, the same operating method and the same quantities of reagent as Test No 7 with the exception of the quantity of sodium persulphate, diluted to 7% in water, which was multiplied by 0.30, and with the exception of the quantity of hydrogen peroxide, diluted to 12% in water, which was multiplied by 0.66.

The polymerizate then obtained in a single step was an orangey-yellow solution corresponding to a sodium and magnesium polyacrylate completely neutralised in a ratio corresponding to a neutralisation of the active acid sites equal to 50% by sodium and 50% by magnesium. The molecular weight $M_w$ of the polyacrylate thus obtained according to the invention was equal to 10,000 determined according to the GPC method cited above.

Test No 10

This test was carried out with the same equipment, the same operating method and the same quantities of reagent as Test No 9 with the exception of the quantity of hydrogen peroxide, diluted to 12.5% in water, which was multiplied by 0.30.

The polymerizate then obtained in a single step was an orangey-yellow solution corresponding to a sodium and magnesium polyacrylate completely neutralised in a ratio corresponding to a neutralisation of the active acid sites equal to 50% by sodium and 50% by magnesium. The molecular weight $M_w$ of the polyacrylate thus obtained according to the invention was equal to 12,600 determined according to the GPC method cited above.

Test No 11

In a two-liter glass reactor equipped with stirring, a thermometer and a cooling system, a load referred to as a tank bottom was prepared at room temperature, composed of 104 grams of water and 11.3 grams of sodium hypophosphite crystallised with one molecule of water.

During the rise in temperature of the tank bottom, six loads to be introduced during the polymerisation were prepared.

For this purpose, 450 grams of 100% acrylic acid were introduced into a first beaker, into a second beaker 15 grams of hydrogen peroxide at 130 volumes and 65 grams of water, into a third beaker 10 grams of sodium persulphate and 70 grams of water, into a fourth beaker 237 grams of soda at 50%, into a fifth beaker 226 grams of 40% magnesium hydroxide in water and into a sixth beaker 33 grams of sodium hypophosphite crystallised with one molecule of water diluted in 40 grams of water.

The soda contained in the fourth beaker was added during the first hour of polymerisation at the same time as the hydrogen peroxide whilst the magnesium hydroxide contained in the fifth was added continuously during the second hour of polymerisation at the same time as the sodium persulphate.

The acrylic acid and sodium hypophosphite were added continuously and separately throughout the polymerisation.

The polymerizate then obtained in a single step was an orangey-yellow solution corresponding to a sodium and magnesium polyacrylate completely neutralised in a ratio corresponding to a neutralisation of the active acid sites equal to 50% by sodium and 50% by magnesium. The molecular weight $M_w$ of the polyacrylate thus obtained according to the invention was equal to 2400 determined according to the GPC method cited above.

Test No 12

This test was carried out with the same equipment, the same operating method and the same quantities of reagent as Test No 11 except for the quantity of sodium hypophosphite in the tank bottom, which was multiplied by 0.59, and that added continuously, which was multiplied by 0.62. Finally, the initiator consisted solely of 20 grams of hydrogen peroxide at 130 volumes diluted in 140 grams of water. This solution was added continuously during the two hours of polymerisation.

The polymerizate then obtained in a single step was an orangey-yellow solution corresponding to a sodium and magnesium polyacrylate completely neutralised in a ratio corresponding to a neutralisation of the active acid sites equal to 50% by sodium and 50% by magnesium. The molecular weight $M_w$ of the polyacrylate thus obtained according to the invention was equal to 5500 determined according to the GPC method cited above.

Test No 13

This test was carried out with the same equipment, the same operating method and the same quantities of reagent as Test No 11 except for the quantity of sodium hypophosphite in the tank bottom, which was multiplied by 0.59, and that contained in the sixth beaker, which was multiplied by 0.62.

The polymerizate then obtained in a single step was an orangey-yellow solution corresponding to a sodium and magnesium polyacrylate completely neutralised in a ratio corresponding to a neutralisation of the active acid sites equal to 50% by sodium and 50% by magnesium. The molecular weight $M_w$ of the polyacrylate thus obtained according to the invention was equal to 6000 determined according to the GPC method cited above.

Test No 14

This test was carried out with the same equipment, the same operating method and the same quantities of reagent as Test No 11 except for the quantity of sodium hypophosphite in the tank bottom, which was multiplied by 0.40, and that contained in the sixth beaker, which was multiplied by 0.42.

The polymerizate then obtained in a single step was an orangey-yellow solution corresponding to a sodium and magnesium polyacrylate completely neutralised in a ratio corresponding to a neutralisation of the active acid sites equal to 50% by sodium and 50% by magnesium. The molecular weight $M_w$ of the polyacrylate thus obtained according to the invention was equal to 8350 determined according to the GPC method cited above.

Test No 15

This test was carried out with the same equipment, the same operating method and the same quantities of reagent as Test No 11 except for the quantity of sodium hypophosphite in the tank bottom, which was multiplied by 3.98, and that contained in the sixth beaker, which was zero, and finally with the exception of the quantity of hydrogen peroxide contained in the second beaker, which was multiplied by 0.66, and the quantity of sodium persulphate contained in the third beaker, which was multiplied by 0.60.

The polymerizate then obtained in a single step was an orangey-yellow solution corresponding to a sodium and magnesium polyacrylate completely neutralised in a ratio corresponding to a neutralisation of the active acid sites equal to 50% by sodium and 50% by magnesium. The molecular weight $M_w$ of the polyacrylate thus obtained according to the invention was equal to 9700 determined according to the GPC method cited above.

Test No 16

This test was carried out with the same equipment, the same operating method and the same quantities of reagent as Test No 12 except for the quantity of soda used, which corresponded to a 40% neutralisation of the active acid sites and that of magnesium hydroxide, which corresponded to a neutralisation of 60% of the active acid sites.

The polymerizate then obtained in a single step was an orangey-yellow solution corresponding to a sodium and magnesium polyacrylate completely neutralised in a ratio corresponding to a neutralisation of the active acid sites equal to 40% by sodium and 60% by magnesium. The molecular weight $M_w$ of the polyacrylate thus obtained according to the invention was equal to 4300 determined according to the GPC method cited above.

Test No 17

This test was carried out with the same equipment, the same operating method and the same quantities of reagent as Test No 16 except for the quantity of magnesium hydroxide, which was multiplied by 0.416.

The polymerizate then obtained in a single step was an orangey-yellow solution corresponding to a sodium and magnesium polyacrylate partially neutralised in a ratio corresponding to a neutralisation of the active acid sites equal to 50% by sodium and 25% by magnesium. The molecular weight $M_w$ of the polyacrylate thus obtained according to the invention was equal to 5000 determined according to the GPC method cited above.

It should be noted in this test that, for measuring the molecular weight by GPC, the polymer was completely neutralised, 50% by the sodium and 50% by the magnesium.

Test No 18

This test was carried out with the same equipment, the same operating method and the same quantities of reagent as Test No 4, with the exception of the quantity of hydrogen peroxide, which was multiplied by 4.08, and with the exception of the quantity of soda used, which corresponded to an 80% neutralisation of the active acid sites, and that of calcium hydroxide, which corresponded to a 20% neutralisation of the active acid sites.

The polymerizate then obtained in a single step was an orangey-yellow solution corresponding to a sodium and calcium polyacrylate completely neutralised in a ratio corresponding to a neutralisation of the active acid sites equal to 80% by sodium and 20% by calcium. The molecular weight $M_w$ of the polyacrylate thus obtained according to the invention was equal to 6000 determined according to the GPC method cited above.

Test No 19

This test was carried out with the same equipment, the same operating method and the same quantities of reagent as Test No 12, with the exception of the quantity of calcium hydroxide used which corresponded to a neutralisation of 25% of the active acid sites and that of magnesium hydroxide, which corresponded to a neutralisation of 25% of the active acid sites, these two alkaline earth hydroxides being added during the second hour of polymerisation.

The polymerizate then obtained in a single step was an orangey-yellow solution corresponding to a sodium, magnesium and calcium polyacrylate totally neutralised in a ratio corresponding to a neutralisation of the active acid sites equal to 50% by sodium, 25% by magnesium and 25% by calcium. The molecular weight $M_w$ of the polyacrylate thus obtained according to the invention was equal to 5730 determined according to the GPC method cited above.

Test No 20

In a two-liter glass reactor equipped with stirring, a thermometer and a cooling system, a load referred to as a tank bottom was prepared at room temperature, composed of 104 grams of water, 43.9 grams of soda at 50% and 45 grams of 97% phosphorous acid.

During the rise in temperature of the tank bottom, five loads to be introduced during the polymerisation were prepared.

For this purpose, 225 grams of 100% acrylic acid were introduced into a first beaker, into a second beaker 15 grams of hydrogen peroxide at 130 volumes and 65 grams of water, into a third beaker 10 grams of sodium persulphate and 70 grams of water, into a fourth beaker 237 grams of soda at 50% and finally into a fifth beaker 233 grams of water and 225 grams of acrylic acid at 100% previously having reacted with 226 grams of magnesium hydroxide at 40% in water.

The soda contained in the fourth beaker was added continuously during the first hour of polymerisation at the same time as the hydrogen peroxide whilst the magnesium acrylate contained in the fifth was added continuously during the second hour of polymerisation at the same time as the persulphate.

The polymerizate then obtained in a single step was an orangey-yellow solution corresponding to a sodium and calcium polyacrylate completely neutralised in a ratio corresponding to a neutralisation of the active acid sites equal to 50% by sodium and 50% by magnesium. The molecular weight $M_w$ of the polyacrylate thus obtained according to the invention was equal to 9500 determined according to the GPC method cited above.

Test No 21

This test was carried out with the same equipment, the same operating method and the same quantities of reagent as Test No 2, with the exception of the fact that the fourth beaker contained 30% of the total quantity of acrylic acid and that the latter had previously reacted with lime.

The polymerizate then obtained in a single step was an orangey-yellow solution corresponding to a sodium and calcium polyacrylate completely neutralised in a ratio corresponding to a neutralisation of the active acid sites equal to 70% by sodium and 30% by calcium. The molecular weight $M_w$ of the polyacrylate thus obtained according to the invention was equal to 11,500 determined according to the GPC method cited above.

Test No 22

This test was carried out with the same equipment, the same operating method and the same quantities of reagent as Test No 1 with the exception of the first beaker, which contained 400 grams of acrylic acid at 100% and 50 grams of acrylamide, the third beaker, which contained 312 grams of soda at 50%, and finally the fourth beaker, which contained 63 grams of calcium hydroxide.

The polymerizate then obtained in a single step was an orangey-yellow solution corresponding to an acrylic acid-acrylamide copolymer completely neutralised by the sodium ion and by the calcium ion in a ratio corresponding to a neutralisation of the active acid sites equal to 70% by the sodium and 30% by the calcium. The molecular weight $M_w$ of the copolymer thus obtained according to the invention was equal to 4200 determined according to the GPC method cited above.

Test No 23

This test was carried out with the same equipment, the same operating method and the same quantities of reagent as Test No 1 with the exception of the first beaker, which contained 400 grams of acrylic acid at 100% and 50 grams of AMPS, the third beaker, which contained 331 grams of soda at 50%, and finally the fourth beaker, which contained 66 grams of calcium hydroxide.

The polymerizate then obtained in a single step was an orangey-yellow solution corresponding to an acrylic acid-AMPS copolymer completely neutralised by the sodium ion and by the calcium ion in a ratio corresponding to a neutralisation of the active acid sites equal to 70% by the sodium and 30% by the calcium. The molecular weight $M_w$ of the copolymer thus obtained according to the invention was equal to 4600 determined according to the GPC method cited above.

Test No 24

This test was carried out with the same equipment, the same operating method and the same quantities of reagent as Test No 1 with the exception of the first beaker, which contained 400 grams of acrylic acid at 100% and 50 grams of methacrylic acid, the third beaker, which contained 343 grams of soda at 50%, and finally the fourth beaker, which contained 68 grams of calcium hydroxide.

The polymerizate then obtained in a single step was an orangey-yellow solution corresponding to an acrylic acid-methacrylic acid copolymer completely neutralised by the sodium ion and by the calcium ion in a ratio corresponding to a neutralisation of the active acid sites equal to 70% by the sodium and 30% by the calcium. The molecular weight $M_w$ of the copolymer thus obtained according to the invention was equal to 4200 determined according to the GPC method cited above.

Test No 25

This test was carried out with the same equipment, the same operating method and the same quantities of reagent as Test No 3, with the exception of the soda, which was replaced by potassium hydroxide.

The polymerizate then obtained in a single step was an orangey-yellow solution corresponding to a potassium and calcium polyacrylate completely neutralised in a ratio corresponding to a neutralisation of the active acid sites equal to 70% by potassium and 30% by calcium. The molecular weight $M_w$ of the copolymer thus obtained according to the invention was equal to 5500 determined according to the GPC method cited above.

EXAMPLE 2

This example relates to the preparation of a suspension of coarse calcium carbonate subjected to grinding in order to refine it in a microparticular suspension. For this purpose, a suspension of coarse calcium carbonate was prepared from a natural calcium carbonate, using:

for Test No 26 illustrating the reference test, the calcium carbonate was simply put in suspension in 25% water without the addition of a dispersant, a dispersion with a concentration of 76% dry matter being impossible to achieve;

for Test No 27 illustrating the invention, the polyacrylate of Test No 1 completely neutralised by the soda and calcium hydroxide in a ratio corresponding to a 70% sodium and 30% calcium neutralisation;

for Test No 28 illustrating the invention, the polyacrylate of Test No 2 completely neutralised by the soda and calcium hydroxide in a ratio corresponding to a 70% sodium and 30% calcium neutralisation;

for Test No 29 illustrating the invention, the polyacrylate of Test No 3 completely neutralised by the soda and calcium hydroxide in a ratio corresponding to a 70% sodium and 30% calcium neutralisation;

for Test No 30 illustrating the invention, the polyacrylate of Test No 4 completely neutralised by the soda and calcium hydroxide in a ratio corresponding to a 70% sodium and 30% calcium neutralisation;

for Test No 31 illustrating the invention, the polyacrylate of Test No 5 completely neutralised by the soda and calcium hydroxide in a ratio corresponding to a 70% sodium and 30% calcium neutralisation;

for Test No 32 illustrating the invention, the polyacrylate of Test No 6 completely neutralised by the soda and calcium hydroxide in a ratio corresponding to a 70% sodium and 30% calcium neutralisation;

for Test No 33 illustrating the invention, the polyacrylate of Test No 7 completely neutralised by the soda and magnesium hydroxide in a ratio corresponding to a 50% sodium and 50% magnesium neutralisation;

for Test No 34 illustrating the invention, the polyacrylate of Test No 8 completely neutralised by the soda and magnesium hydroxide in a ratio corresponding to a 50% sodium and 50% magnesium neutralisation;

for Test No 35 illustrating the invention, the polyacrylate of Test No 9 completely neutralised by the soda and magnesium hydroxide in a ratio corresponding to a 50% sodium and 50% magnesium neutralisation;

for Test No 36 illustrating the invention, the polyacrylate of Test No 10 completely neutralised by the soda and magnesium hydroxide in a ratio corresponding to a 50% sodium and 50% magnesium neutralisation;

for Test No 37 illustrating the invention, the polyacrylate of Test No 11 completely neutralised by the soda and magnesium hydroxide in a ratio corresponding to a 50% sodium and 50% magnesium neutralisation;

for Test No 38 illustrating the invention, the polyacrylate of Test No 12 completely neutralised by the soda and magnesium hydroxide in a ratio corresponding to a 50% sodium and 50% magnesium neutralisation;

for Test No 39 illustrating the invention, the polyacrylate of Test No 13 completely neutralised by the soda and magnesium hydroxide in a ratio corresponding to a 50% sodium and 50% magnesium neutralisation;

for Test No 40 illustrating the invention, the polyacrylate of Test No 14 completely neutralised by the soda and magnesium hydroxide in a ratio corresponding to a 50% sodium and 50% magnesium neutralisation;

for Test No 41 illustrating the invention, the polyacrylate of Test No 15 completely neutralised by the soda and magnesium hydroxide in a ratio corresponding to a 50% sodium and 50% magnesium neutralisation;

for Test No 42 illustrating the invention, the polyacrylate of Test No 16 completely neutralised by the soda and magnesium hydroxide in a ratio corresponding to a 40% sodium and 60% magnesium neutralisation;

for Test No 43 illustrating the invention, the polyacrylate of Test No 17 partially neutralised by the soda and magnesium hydroxide in a ratio corresponding to a 50% sodium and 25% magnesium neutralisation;

for Test No 44 illustrating the invention, the polyacrylate of Test No 18 completely neutralised by the soda and calcium hydroxide in a ratio corresponding to a 80% sodium and 20% calcium neutralisation;

for Test No 45 illustrating the invention, the polyacrylate of Test No 19 completely neutralised by soda, magnesium hydroxide and calcium hydroxide in a ratio corresponding to a 50% sodium —25% magnesium —25% calcium neutralisation;

for Test No 46 illustrating the invention, the polyacrylate of Test No 20 completely neutralised by the soda and magnesium hydroxide in a ratio corresponding to a 50% sodium and 50% magnesium neutralisation;

for Test No 47 illustrating the invention, the polyacrylate of Test No 21 completely neutralised by the soda and calcium hydroxide in a ratio corresponding to a 70% sodium and 30% calcium neutralisation;

for Test No 48 illustrating the invention, the acrylic acid-acrylamide copolymer of Test No 22 completely neutralised by the soda and calcium hydroxide in a ratio corresponding to a 70% sodium and 30% calcium neutralisation;

for Test No 49 illustrating the invention, the acrylic acid-AMPS copolymer of Test No 23 completely neutralised by soda and calcium hydroxide in a ratio corresponding to a 70% sodium —30% calcium neutralisation;

for Test No 50 illustrating the invention, the acrylic acid-methacrylic acid copolymer of Test No 24 completely neutralised by soda and calcium hydroxide in a ratio corresponding to a 70% sodium —30% calcium neutralisation;

for Test No 51 illustrating the invention, the polyacrylate of Test No 25 completely neutralised by potash and calcium hydroxide in a ratio corresponding to a 70% potassium —30% calcium neutralisation.

For each test, an aqueous solution was prepared from calcium carbonate coming from the Orgon (France) deposit, with a mean diameter of around 50 micrometers.

The aqueous suspension had a dry matter concentration of 76% by weight with respect to the total mass with the exception of the reference test, for which the suspension had a dry matter concentration of 25% by weight with respect to the total mass.

The grinding aid agent was introduced into this suspension in the quantities indicated in the following table, expressed as a percentage by dry weight with respect to the weight of dry calcium carbonate to be ground.

The suspension circulated in a grinder of the Dyno-Mill type with a fixed cylinder and rotating impeller, whose grinding body consisted of corundum balls with a diameter in the range from 0.6 millimeters to 1.0 millimeters.

The total volume occupied by the grinding body was 1150 cubic centimeters whilst its weight was 2900 g.

The grinding chamber had a volume of 1400 cubic centimeters.

The circumferential speed of the grinder was 10 meters per second.

The calcium carbonate suspension was recycled at the rate of 18 liters per hour.

The outlet of the Dyno-Mill grinder was provided with a 200 micron mesh separator for separating the suspension resulting from the grinding and the grinding body. The temperature during each grinding test was maintained at approximately 60° C.

At the end of the grinding (To), a sample of the pigmentary suspension was recovered in a flask. The granulometry of this suspension (% of the particles less than 1 micrometer) was measured by means of a Sedigraph 5100 granulometer from Micromeritics.

The Brookfield viscosity of the suspension was measured by means of a Brookfield viscometer type RVT, at a temperature of 20° C. and speeds of rotation of 10 revolutions per minute and 100 revolutions per minute with the appropriate spindle.

After a residence time of 8 days in the flask, the viscosity of the suspension was measured by introducing, into the unstirred flask, the appropriate spindle of the Brookfield viscometer type RVT, at a temperature of 20° C. and speeds of rotation of 10 revolutions per minute and 100 revolutions per minute (viscosity BS=before stirring).

The same viscosity measurements were also made once the flask had been stirred and constitute the AS (after stirring) viscosity results.

All these experimental results are set out in Tables 1 and 1a below, which also indicate the consumption, as a percentage by weight, of grinding-aid agent used for obtaining the granulometry indicated:

10 parts, expressed as dry matter, of a styrene-butadiene latex sold by Dow under the name "DL 950",
0.25 parts, expressed as dry matter, of co-binder sold by Coatex under the name Rheocoat® 35.

TABLE 1

| TEST N° | DRY MATTER CONCENTRATION OF THE SUSPENSION | GRINDING-AID AGENT | | | GRANULO-METRY (% particles <1 μm) | BROOKFIELD VISCOSITY OF THE SUSPENSION (at 20° C. in mPa · s) | | |
|---|---|---|---|---|---|---|---|---|
| | | Polymer Test N° | $M_w$ | Consumption of agent as a dry/dry % | | T0 10 rev/min–100 rev/min | 8 days BS 10 rev/min–100 rev/min | 8 days AS 10 rev/min–100 rev/min |
| 26 | 25 | — | — | — | — | 800–450 | 20,000–2500 | 1200–650 |
| 27 | 76 | 1 | 4400 | 1.27 | 80 | 1800–670 | 4555–1010 | 1860–680 |
| 28 | 76 | 2 | 5000 | 1.24 | 80 | 2090–660 | 7490–1370 | 2790–900 |
| 29 | 76 | 3 | 6200 | 1.26 | 80 | 1670–530 | 4555–1070 | 1880–685 |
| 30 | 76 | 4 | 7200 | 1.20 | 75.3 | 2300–775 | 6080–1210 | 1810–635 |
| 31 | 76 | 5 | 5500 | 1.30 | 80 | 2200–700 | 6000–1200 | 2000–700 |
| 32 | 76 | 6 | 3800 | 1.25 | 80 | 1900–690 | 5500–1100 | 1920–690 |
| 33 | 76 | 7 | 3800 | 1.26 | 76 | 1790–590 | 4400–1040 | 1400–460 |
| 34 | 76 | 8 | 8600 | 1.16 | 67 | 780–315 | 5600–1310 | 840–330 |
| 35 | 76 | 9 | 10,000 | 1.26 | 72 | 2680–860 | 11,800–1880 | 3230–1090 |
| 36 | 76 | 10 | 12,600 | 1.25 | 65 | 1550–580 | 16,800–2410 | 2240–790 |
| 37 | 76 | 11 | 2400 | 1.22 | 80 | 5055–1470 | 4660–3400 | 10,860–2500 |
| 38 | 76 | 12 | 5500 | 1.28 | 77 | 2200–750 | 6400–1900 | 5500–1545 |
| 39 | 76 | 13 | 6000 | 1.32 | 70 | 1230–500 | 6000–1200 | 1300–525 |

BS: Measurement of the viscosity before stirring of the suspension
AS: Measurement of the viscosity after stirring of the suspension
Test N° 26 is the reference test
Tests 27 to 39 relate to the invention TABLE 1a

| TEST N° | DRY MATTER CONCENTRATION OF THE SUSPENSION | GRINDING-AID AGENT | | | GRANULO-METRY (% particles <1 μm) | BROOKFIELD VISCOSITY OF THE SUSPENSION (at 20° C. in mPa · s) | | |
|---|---|---|---|---|---|---|---|---|
| | | Polymer Test N° | $M_w$ | Consumption of agent as a dry/dry % | | T0 10 rev/min–100 rev/min | 8 days BS 10 rev/min–100 rev/min | 8 days AS 10 rev/min–100 rev/min |
| 40 | 76 | 14 | 8350 | 1.34 | 68 | 2410–820 | 15,500–2340 | 2400–900 |
| 41 | 76 | 15 | 9700 | 1.28 | 73 | 7000–1600 | 28,200–3600 | 16,400–2600 |
| 42 | 76 | 16 | 4300 | 1.40 | 72 | 3000–1100 | 9000–2700 | 4200–1200 |
| 43 | 76 | 17 | 5000 | 1.25 | 78 | 2500–830 | 7000–2500 | 3500–1000 |
| 44 | 76 | 18 | 6000 | 1.25 | 77 | 2600–800 | 7500–1500 | 2200–700 |
| 45 | 76 | 19 | 5730 | 1.12 | 80 | 3500–1000 | 7500–1500 | 3700–1150 |
| 46 | 76 | 20 | 9500 | 1.27 | 74 | 3080–930 | 11,080–1680 | 3100–1040 |
| 47 | 76 | 21 | 11,500 | 1.20 | 72 | 4600–1400 | 16,800–2150 | 2920–1075 |
| 48 | 76 | 22 | 4200 | 1.25 | 77 | 2200–800 | 6500–1300 | 2200–730 |
| 49 | 76 | 23 | 4600 | 1.25 | 80 | 1850–700 | 4700–1070 | 1930–710 |
| 50 | 76 | 24 | 4200 | 1.32 | 80 | 2500–750 | 7800–1800 | 2600–850 |
| 51 | 76 | 25 | 5500 | 1.15 | 80 | 5000–1500 | 12,000–3000 | 6800–1850 |

BS: Measurement of the viscosity before stirring of the suspension
AS: Measurement of the viscosity after stirring of the suspension
Tests 40 to 51 relate to the invention A reading of Tables 1 and 1a show the efficacy of the polymers of the invention, obtained by the method according to the invention, as a grinding aid of an aqueous suspension of mineral materials with a high concentration of dry matter.

EXAMPLE 3

This example relates to the use of an aqueous suspension of calcium carbonate according to the invention in the field of paper. This example also relates to the use of polymers according to the invention as water retaining agent. For this purpose, different 100% calcium carbonate coating colors are prepared and are composed of:
  100 parts, expressed as dry matter, of an aqueous suspension of calcium carbonate to be tested, The various following tests are carried out:

Test No 52

This test illustrates the prior art and implements a carbonate calcium suspension sold by Omya under the name Hydrocarb® 90 OG.

Test No 53

This test illustrates the invention and implements a carbonate calcium suspension with the same above-cited granulometry and containing the same polymer as the invention of test No 6.

For both tests, the water-retention of the coating colors is determined by the method described hereafter.

The paper coating color to be tested is subjected to a pressure of 100 psi (7 bars) in a standard cylinder, equipped with a surface of the filter paper type capable of allowing water to pass.

After 20 minutes, the volume of water collected is measured in ml.

The lower the volume of water collected at the end of 20 minutes, the better is the retention.

To do this, use is made of an "API Fluid Loss Measurement" filter press (FIG. 1/1) from Baroïd, which is composed essentially of a clamp (1) provided with a clamping screw (2) for locking the three parts of the filter body (3).

This body (3) is composed of:
- a base (4) with a hole provided with a nozzle through which the filtrate flows. This base (4) supports a metallic sieve (5) with a mesh of 60 to 80, on which is placed the 90 mm diameter filter paper (6) (Whatman® No 50), the equivalent of which is the DURIEUX BLEU® No 3 type,
- a cylinder with an inside diameter of 76.2 mm and a height of 128 mm,
- a cover (7) provided with a compressed gas inlet, whose seal with the cylinder is provided by means of a flat joint (8), of the same type as those (9) placed on the base (4).

To use the filter press, the following are fitted in the following order:
- the joint (9) on the base (4)
- the sieve (5) on the joints (9)
- the filter paper (6) on the sieve (5)
- the second joint (10) on the filter paper (6) and the cylinder is fitted on the base (4) before locking the bayonet system.

Then it is filled with the coating color to be tested (approximately 480 g up to 3 cm from the top of the cylinder) before placing the cover (7) on the cylinder, interposing a joint (8).

Then the assembly is placed in the clamp (1) and is locked by means of the clamping screw (2), and then a graduated tube (12) is arranged underneath the nozzle.

A pressure of 7 bars is applied, simultaneously triggering a chronometer.

After 20 minutes the volume of fluid collected in the test tube (12) is noted. The accuracy of the result obtained is +0.2 ml.

The results of the water-retention measurement obtained, according to the method described above in the description, are set out in Table 2 below.

The results of the measurements of Brookfield viscosity determined at 10 and 100 revolutions per minute at 25° C. by means of a Brookfield viscometer type DV-1 equipped with the appropriate spindle also appear in Table 2.

TABLE 2

| Test n° | | Prior art 52 | Invention 53 |
|---|---|---|---|
| FORMULATIONS: | | | |
| Pigments: | | | |
| Calcium carbonate Hydrocarb ™ 90 OG | | 100 | |
| Calcium carbonate according to the invention | | | 100 |
| Latex: | | | |
| DL 950 | | 10 | 10 |

TABLE 2-continued

| Test n° | | Prior art 52 | Invention 53 |
|---|---|---|---|
| Coliants: | | | |
| Rheocoat ™ 35 | | 0, 25 | 0, 25 |
| Solid content (%) | | 66, 2 | 66, 2 |
| pH | | 9 | 9 |
| Brookfield viscosities (mPa.s) | 10 rev/mm | 2 700 | 3 570 |
| | 100 rev/mm | 632 | 715 |
| Water-retention API (ml) | Vol in 20 min | 3, 25 | 2, 65 |

The reading of Table 2 shows the use of aqueous suspensions of mineral materials according to the invention in the field of paper as well as the use of polymers according to the invention as water retaining agent in the paper making industry.

EXAMPLE 4

This example relates to the use of aqueous suspensions of mineral materials according to the invention in a water-based interior matt paint. For this purpose, the efficiency as a dispersant of the polymers of the invention contained in the aqueous suspensions of mineral materials of the invention implemented in a interior matt paint.

Thus, for the tests No 54 and 55, 0.12% by dry weight of the tested dispersant relative to the total weight of a same water-based matt paint formula was added under agitation to a container which already held 144.5 g of water and 1 g of 28% ammonia.

After agitating for a few seconds, once the polymer to be tested has been added to the water containing ammonia, the other constituents of the said water-based matt paint were added in succession, these being:

| | |
|---|---|
| 2 g | of a biocide, marketed by Troy under the name of MERGAL ™ K6N |
| 1 g | of an anti-foaming agent marketed by Henkel under the name of NOPCO ™ NDW |
| 69 g | of rutile titanium oxide marketed by Millenium under the name TIONA RL 68 |
| 311.4 g | of natural calcium carbonate marketed by Omya under the name of DURCAL ™ 5 |
| 204 g | of natural calcium carbonate marketed by Omya under the name of HYDROCARB ™ |
| 154.7 g | of a styrene-acrylic binder in dispersion, marketed by Rhodia under the name of RHODOPAS ™ DS 910 |
| 10 g | of monoethylene glycol |
| 10 g | of coalescing agent marketed by Eastman Chemicals under the name TEXANOL |
| 1.3 g | of 28% ammonia |
| 10.0 g | of a thickening agent marketed by Coatex under the name RHEO ™ 3000 | quantity to make up 1000 g—water.

The various tests are:

Test No 54

This test is the reference test and illustrates the prior art implementing a sodium polyacrylate marketed by Coatex under the name COATEX P50.

Tests No 55

This test illustrates the invention and implements the polymer of the invention of test No 6.

For each of these tests, after agitating the aqueous composition made up in this way for a few minutes, the Brookfield viscosities of the different compositions are measured at 25° C. and at 10 revolutions per minute and 100 revolutions per minute using a standard RVT Brookfield viscometer fitted with the requisite spindle.

The rheological stability of the formulae over time and in terms of temperature is determined by measuring the Brookfield viscosities at 10 revolutions per minute and 100 revolutions per minute and at 25° C. of these same formulae after storing at ambient temperature without agitation for 24 hours and for one week.

All these results are set out in table 3 below:

TABLE 3

| | TEST No | DISPERSANT DRY % WEIGHT | BROOKFIELD VISCOSITY OF THE PAINT | | |
|---|---|---|---|---|---|
| | | | T = 0 10 rev/min– 100 rev/min (mPa.s) | T = 24 hours 10 rev/min– 100 rev/min (mPa.s) | T = 1 week, 25° C. 10 rev/min– 100 rev/min (mPa.s) |
| Prior art | 54 | 0, 12 | 13700–3700 | 17000–4900 | 19400–5600 |
| Invention | 55 | 0, 12 | 12600–3400 | 15900–4600 | 18200–5050 |

The reading of table 3 shows the use of aqueous suspensions of mineral materials according to the invention in the field of paint.

EXAMPLE 5

The purpose of this example is to illustrate the use of the polymers of the invention as an anti-scaling agent in water treatment applications, by measuring the delay in the precipitation of alkaline earths and more specifically calcium carbonate contained in natural or artificial waters, saline or not, in the presence of the said polymers.

To this end, for each of the tests, town water containing 5 ppm by dry weight of each of the polymers to be tested is introduced into a one-liter flask provided with a coolant, with the exception of test No 56, which is the reference test and in which the town water does not contain any polymer.

Tests No 57 and 58 illustrate the invention using the copolymers produced from tests No 6 and 11 respectively.

This water is heated to boiling point and under reflux. At t=0, i.e. when the first ring of bubbles (start of boiling) appears, a 20 ml test sample is taken. This water is immediately filtered on a 0.45 micron Millipore filter then transferred to a 100 ml beaker to be metered with EDTA. For this purpose, a MERCK indicator buffer tablet, reference 108430, 3 ml ammonia buffer, is inserted in the beaker and agitated with a magnetic bar before filtering the water. After a few seconds of agitation, the EDTA 5.10–3 M is tapped using a burette until it is clear green in colour. The TH (hydrotimetric titre) obtained is calculated by Volume EDTA tapped ×2.5=TH in ° French (1 degree French=10 mg expressed in $CaCo_3$ per liter of water) and the value obtained is then written TH 0. Similarly, samples are taken after 15 and 30 minutes of boiling. The TH values obtained are then noted TH 15 and TH 30 minutes boiling and are set out in table 4 below:

TABLE 4

| | TEST No | ANTI-SCALING AGENT | TH 0 | TH 15 | TH 30 |
|---|---|---|---|---|---|
| REFERENCE TEST | 56 | — | 29, 4 | 7, 9 | 6,6 |
| INVENTION | 57 | Polymer test No 6 | 29, 5 | 20, 1 | 15, 8 |
| INVENTION | 58 | Polymer test No 11 | 29, 4 | 20, 1 | 16, 5 |

The efficiency of the polymers of the invention obtained using the method of the invention as an anti-scale agent can be seen from table No 4.

EXAMPLE 6

This example relates to chlorinated alkaline formulae used, amongst other things, as a bleaching and disinfecting agent in detergents but could also relate to other bleaching agents commonly used in detergency.

More specifically, the purpose is to demonstrate the fact that the use of the polymers of the invention as an anti-scale and dispersing agent in these formulae is not detrimental to the stability of a chlorinated alkaline composition in terms of a decrease in the chloroetric rate which would imply a loss in efficiency of the hypochlorite solution contained in the detergent compound.

In this case, for each test, 29.35 grams of bleach with a chlorometric rate of 36.96 and 15 grams of 50% soda are added under agitation to a 200 ml beaker containing 50.65 grams of water.

Once this mixture has homogenised, 5 grams of the polymer to be tested are added except in the case of test No 59, which is the reference test and to which no polymer is added.

After waiting for the mixture to cool, 10 ml of the said mixture are diluted in 100 ml of water.

After dilution, the hypochlorites present in 20 ml of the diluted chlorinated alkaline composition are metered.

The hypochlorites are metered using the Bunsen method based on the principle of oxidation of the iodide ions by the hypochlorite ions. The iodine thus released is titrated by a solution of 0.1 N sodium thiosulphate which enables the chlorometric rate of the chlorinated alkaline composition to be derived by a process of calculation.

The chlorometric rate (°CL) for the 20 ml test sample is worked out as follows:

$$°CL = \frac{\text{Volume of sodium thiosulphate}}{20} \times 11.2$$

The value obtained for the reference test No 59 is then used as a reference value and represents 100% of hypochlorite present in the formula.

The different tests conducted are:

Test No 59

Reference test with no polymer.

Test No 60

Test illustrating the prior art using a sodium polyacrylate produced by any method of the prior art and having a molecular weight $M_w$ equal to 5500.

Test No 61

Test illustrating the invention and using the polymer of test No 2.

For each of these tests, the chlorometric rate is determined by the same metering method after 24 hours and 8 days.

The results in percentage residual hypochlorite as compared with the reference are set out in table 5 below:

TABLE 5

| TEST No | POLYMER | T0 (%) | 24 hours (%) | 8 days (%) |
|---|---|---|---|---|
| REFERENCE TEST | 59 | — | 100 | 100 | 99, 5 |
| PRIOR ART | 60 | Sodium polyacrylate of $M_W = 5500$ | 100 | 98, 4 | 90, 6 |
| INVENTION | 61 | Polymer of test No 2 | 100 | 99, 5 | 95, 0 |

A reading of Table 5 above shows the change in the chlorometric number of each of the solutions and illustrates the fact that the polymers according to the invention obtained by the method of the invention make it possible not to destabilise the chlorometric number of the chlorinated alkaline composition.

EXAMPLE 7

This example concerns the use of a polymer according to the invention in the field of ceramics.

For this purpose, tests are first of all carried out on the efficacy of the polymer as a clay dispersant for slip and then tests of efficacy as an agent for grinding the clays used in the field of ceramics.

Test of efficacy as a dispersant:

For this purpose, untreated water and the polymer according to the invention to be tested were weighed in a 500 ml beaker stirred by means of a 70 mm diameter blade.

Then the clay was added in a shower and dispersion was carried out for 20 minutes at 1200 rev/min.

| Raw materials | Quantity (g) |
|---|---|
| Untreated water | 300.09 |
| Polymer of Test No 6 | 1.538 |
| Clay | 200.00 |
| Quantity of dispersant dry/dry | 0.30% |

The slip thus produced was transferred to a flow viscometer of the Lehmann viscometer type. A first viscosity measurement was carried out at time $T_0$ and then a second at time $T_{10\ min}$.

The flow times read were 27.4 secs for the measurement at time $T_0$ and 31.05 for the measurement at $T_{10\ min}$. Given that a polymer is acceptable when the flow time at $T_0$ is less than 30 and the time at $T_{10\ min}$ is less than 35, the polymer is perfectly usable for the dispersion of clay for slip.

Test of efficacy as a clay grinding agent:

In a 400 ml ceramic jar, 300 g of 16 mm diameter ceramic balls (that is to say approximately 35 balls) were weighed. Next the clay and then the untreated water and finally the polymer according to the invention were weighed. The jar was closed and was placed on the grinder. Next grinding was carried out for 10 minutes at 560 rev/min. The grinder was finally stopped and a Ford No 4 beaker was filled with the slip.

| Raw materials | Quantity (g) |
|---|---|
| Clay | 133.33 |
| Untreated water | 200.06 |
| Polymer of Test No 6 | 1.367 |
| Quantity of dispersant dry/dry | 0.40% |

The flow time was measured with the Ford No 4 beaker ($T_0$), the slip was kept and a second measurement was carried out at time $T_{5\ min}$. The flow time at $T_0$ was 22.5 secs and that at $T_{5\ min}$ was 26.7. Given that, in order to be useable for grinding, the polymer must make it possible to obtain a slip with a flow time $T_0$ of less than 25 secs and an increase in the flow time at 5 min of less than 25% of the value at time $T_0$, in order to allow complete and rapid discharge of industrial grinders. The polymer can therefore be used as a clay grinding agent for an application in ceramics.

EXAMPLE 8

This example concerns the use of a polymer according to the invention as thinning agent of a drilling fluid.

1) Operating method:

In a Hamilton Beach bowl, synthetic sea water was weighed. This was stirred using the Hamilton Beach and the different clays and powders were added in a shower, stirring for 10 minutes between each addition. The pH was adjusted to 10.5 using 50% sodium hydroxide. The polymer according to the invention to be tested was added and stirring was carried for a further 10 minutes. The pH was once again adjusted to 10.5 using 25% sodium hydroxide. The mud obtained was poured into a rolling cell and was placed in the temperature rolling oven and left to age for one night at 150° C. with rolling (approximately 70 revolutions/minute).

2) Formulation

| Raw materials | Quantity (g) |
|---|---|
| Sea Water | 375.9 |
| Swelling clay | 17.655 |
| Filler clay | 10.088 |
| Barytes | 277.5 |
| Filtrate reducing agent | 5.35 |
| Polymer of Test No 16 | 7.5 |
| Quantity of dispersant dry/dry | 0.96% |

After rolling, the cell was recooled, the mud was poured into a Hamilton Beach bowl and stirred for 3 mins. At the end of the stirring, the rheological parameters of the mud were measured by means of a Fann viscometer. The plastic viscosity (Vp) found was 30 mpa·s, the yield value (Yv) 16 and the 10 secs and 10 min gels were 3.5 and 8 mPa·s. The polymer according to the invention therefore makes it possible to obtain a correct viscosity of the mud (Vp) allowing easy pumping and a yield value enabling the cuttings to be well held in suspension. The slight increase in gel between 10 secs and 10 min allows easy resumption of pumping after a stoppage of the well.

EXAMPLE 9

This example concerns the use of a polymer according to the invention as a co-builder in detergents with a low phosphate level.

A detergent having the following dry composition was prepared by putting in a slurry and then atomising against the flow in an atomiser with a high-pressure injection head.

Composition

| | |
|---|---|
| Builder (sodium tripolyphosphate) | 17 |
| Co-Builder (polymer according to the invention to be tested) | 8 |
| Surfactant (n-docecylbenzenesulphonate) | 18 |
| Stabiliser (sodium metasilicate) | 7 |
| Stabiliser (magnesium silicate) | 2 |
| Bleaching agent (sodium perborate) | 21 |
| Bleaching activator | 2 |
| Filling agent (sodium sulphate) | 25 |

The detergent was then used for washing a square of soiled cotton, under the following conditions:

| | |
|---|---|
| Temperature changing from | 25 to 65° C. |
| Duration of washing cycle | 45 min |
| Hardness of water | 300 ppm in $CaCO_3$ equivalent (Ca: Mg = 2/1) |
| Washing powder concentration | 10 g/l |

The efficacy of the polymer was measured by the mean whiteness (reflectance) of the piece of the cotton. The piece washed with a washing powder in which the polymer according to the invention is replaced by the filling agent gave a reflectance of 52% whilst with the polymer of test No 2 according to the invention the reflectance was 56%. This increase represents an increased whiteness afforded by the property which the polymer has to reduce the formation of alkaline-earth salts which are insoluble during washing.

What is claimed is:

1. A method of making homopolymers and/or copolymers, in aqueous solution, comprising polymerizing one or more ethylenically unsaturated monomers in the presence of phosphorous acid and/or its salts or sodium hypophosphite and wherein during said polymerizing, the one or more ethylenically unsaturated monomers are neutralized by the continuous addition of, first, one or more bases selected from sodium hydroxide, potassium hydroxide or lithium hydroxide, and then one or more bases selected from calcium hydroxide, calcium oxide, magnesium hydroxide or magnesium oxide.

2. The method according to claim 1, wherein said polymerizing is performed in the presence of phosphorous acid, and wherein the total quantity of phosphorous acid used, is introduced before the start of the polymerization as a load in a tank bottom of a polymerization reactor.

3. The method according to claim 1, wherein said polymerizing is performed in the presence of sodium hypophosphite, and wherein all or some of the sodium hypophosphite is introduced before the start of the polymerization as a load in a tank bottom of a reactor.

4. The method according to claim 1, wherein the quantity of phosphorous acid and/or its salts, or of sodium hypophosphite is greater than or equal to 0.5% by weight with respect to the total mass of the monomer or monomers.

5. The method according to claim 1, wherein the sodium hydroxide, potassium hydroxide or lithium hydroxide are added in the form of a solution, in the form of a powder or in the form of pellets.

6. The method according to claim 1, wherein the calcium hydroxide, calcium oxide, magnesium hydroxide or magnesium oxide are added in the form of a suspension, in the form of a powder or in the form of salts of anionic monomers.

7. The method according to claim 1, wherein the one or more ethylenically unsaturated monomers comprise at least one ethylenically unsaturated anionic monomer.

8. The method according to claim 1, wherein the one or more ethylenically unsaturated monomers comprise acrylic acid.

9. The method according to claim 6, wherein the salts of anionic monomers are selected from the group consisting of calcium acrylate, calcium methacrylate, magnesium acrylate, magnesium methacrylate and a mixture thereof.

10. The method according to claim 7, wherein the ethylenically unsaturated anionic monomer is selected from the group consisting of acrylic acid, methacrylic acid, itaconic acid, crotonic acid, fumaric acid, maleic anhydride, isocrotonic acid, aconitic acid, mesaconic acid, sinapinic acid, undecylenic acid, angelic acid, acrylamido methyl propanesulphonic acid, sodium methallylsulphonate and a mixture thereof.

11. The method according to claim 1, wherein the one or more ethylenically unsaturated monomers are selected from the group consisting of acrylamide and methacrylamide.

12. The method according to claim 1, wherein the one or more ethylenically unsaturated monomers comprise an ethylenically unsaturated non-ionic monomer selected from the group consisting of acrylamide and methacrylamide.

\* \* \* \* \*

UNITED STATES PATENT AND TRADEMARK OFFICE
CERTIFICATE OF CORRECTION

PATENT NO. : 6,956,090 B1  
DATED : October 18, 2005  
INVENTOR(S) : Jean-Marc Suau et al.

It is certified that error appears in the above-identified patent and that said Letters Patent is hereby corrected as shown below:

<u>Title page,</u>  
Item [57], ABSTRACT,  
Line 3, "neutralization" should read -- neutralisation --.

<u>Column 17,</u>  
Line 44, "+0.2" should read -- ±0.2 --.

<u>Column 18,</u>  
Lines 10 and 11, "rev/mm" should read -- rev/min --.

<u>Column 22,</u>  
Line 60, "mpa.s" should read -- mPa.s --.

Signed and Sealed this

Fourth Day of April, 2006

JON W. DUDAS  
*Director of the United States Patent and Trademark Office*